(12) United States Patent
Palmer (10) Patent No.: US 10,895,398 B2
(45) Date of Patent: Jan. 19, 2021

(54) RECESSED-MOUNTED AIR CONDITIONING UNIT

(71) Applicant: Ice Qube, Inc., Pittsburgh, PA (US)

(72) Inventor: Jeffrey Scott Palmer, Ligonier, PA (US)

(73) Assignee: Ice Qube, Inc., Greensburg, PA (US)

( * ) Notice: Subject to any disclaimer, the term of this patent is extended or adjusted under 35 U.S.C. 154(b) by 130 days.

(21) Appl. No.: 15/908,180

(22) Filed: Feb. 28, 2018

(65) Prior Publication Data

US 2018/0328618 A1    Nov. 15, 2018

Related U.S. Application Data

(60) Provisional application No. 62/465,356, filed on Mar. 1, 2017.

(51) Int. Cl.
| | |
|---|---|
| F24F 13/02 | (2006.01) |
| F24F 1/0018 | (2019.01) |
| F24F 1/027 | (2019.01) |
| F24F 13/20 | (2006.01) |
| F24F 11/56 | (2018.01) |
| B60H 1/00 | (2006.01) |
| F24F 11/52 | (2018.01) |
| F24H 4/00 | (2006.01) |

(Continued)

(52) U.S. Cl.
CPC ..... *F24F 13/0254* (2013.01); *B60H 1/00364* (2013.01); *F24F 1/0018* (2013.01); *F24F 1/027* (2013.01); *F24F 11/56* (2018.01); *F24F 13/20* (2013.01); *B60H 2001/00228* (2013.01); *F24F 11/52* (2018.01); *F24F 2110/10* (2018.01); *F24H 4/00* (2013.01)

(58) Field of Classification Search
CPC ........ F24F 1/0018; F24F 1/028; F24F 1/0057; F24F 13/1486; F24F 1/027; F24F 13/0254; F24F 13/20; B60H 1/00364
USPC .......................... 454/232, 236, 141–143, 159
See application file for complete search history.

(56) References Cited

U.S. PATENT DOCUMENTS

| | | | | |
|---|---|---|---|---|
| 3,200,609 | A | * | 8/1965 | Laing ...................... F04D 17/04 62/280 |
| 4,192,542 | A | * | 3/1980 | Hill ..................... B60H 1/00364 296/173 |

(Continued)

FOREIGN PATENT DOCUMENTS

| | | | | |
|---|---|---|---|---|
| CN | 208682828 | U * | 4/2019 | |
| GB | 765498 | A * | 1/1957 | ........... F25D 31/007 |
| WO | WO-2007083501 | A1 * | 7/2007 | ............. F24F 1/0057 |

OTHER PUBLICATIONS

"Machine Translation of CN208682828", 2019.*
"Machine Translation for WO2007083501A1". 2020.*

*Primary Examiner* — Vivek K Shirsat
*Assistant Examiner* — Christopher Matthew Odell
(74) *Attorney, Agent, or Firm* — Cafardi, Ferguson, Wyrick, Weis & Gabriel, LLC; Andrew M. Gabriel (57) ABSTRACT

An embodiment includes an air conditioner, including: a housing including an ambient side and an enclosure side, where the enclosure side faces an enclosure to be cooled by the air conditioner; the ambient side including an interface that fits in a flush-mounted configuration with respect to a wall of the enclosure to be cooled, whereby the entire air conditioner is disposed within the enclosure. Other embodiments are described and claimed.

13 Claims, 5 Drawing Sheets

(51) Int. Cl.
    *F24F 110/10* (2018.01)
    *F24F 1/0057* (2019.01)

(56) References Cited

U.S. PATENT DOCUMENTS

| | | | | |
|---|---|---|---|---|
| 5,038,577 | A * | 8/1991 | Stanford | F24F 1/022 |
| | | | | 454/236 |
| 6,174,342 | B1 * | 1/2001 | Jeanseau | B01D 46/10 |
| | | | | 55/385.2 |
| 10,259,287 | B2 * | 4/2019 | Reynolds | B60H 1/00407 |
| 2006/0032260 | A1 * | 2/2006 | Kang | F24F 1/0007 |
| | | | | 62/317 |
| 2008/0073071 | A1 * | 3/2008 | Zwicker | H01C 10/38 |
| | | | | 165/287 |
| 2012/0248818 | A1 * | 10/2012 | Cochran | B60P 3/341 |
| | | | | 296/168 |
| 2018/0335222 | A1 * | 11/2018 | Wang | F04D 17/162 |
| 2019/0331350 | A1 * | 10/2019 | Choi | F24F 13/20 |

\* cited by examiner

RECESSED-MOUNTED AIR CONDITIONING UNIT

CROSS REFERENCE TO RELATED APPLICATIONS

This Application claims priority to U.S. Provisional Patent Application Ser. No. 62/465,356, filed on Mar. 1, 2017, having the title: RECESSED-MOUNTED AIR CONDITIONING UNIT, the contents of which are incorporated by reference in their entirety herein.

BACKGROUND

In a conventional window air conditioning unit installation, a window acts as a partition or divider between an enclosed space to be cooled and the outside (or ambient) environment. Window air conditioner units are typically mounted underneath the window sash such that the ambient side of the unit extends into the outside environment, while at least a portion of the cooling side stays within the enclosed space. The unit has an evaporator coil disposed in the cooling side which can absorb heat from inside the enclosed space and a condenser coil, positioned on the ambient side of the unit, ejects the heat to the outside environment. A condenser coil is positioned in the ambient side of the unit to facilitate this heat exchange. Air that is cooled when passed over the evaporator coils of the enclosure side is then recirculated back into the enclosed space, e.g., using a fan.

On the ambient side of the unit, ambient air is drawn into the unit through vents disposed on the sides, top, and/or bottom of the unit. Heat ejected by the evaporator is transferred to the condenser by a heat pump, and the condenser transfers the heat to the ambient air flowing therethrough as the ambient air is circulated through the condenser coils and back to the external environment. These units can also work essentially in reverse, i.e., to heat the air in the enclosed space.

SUMMARY

In summary, one embodiment provides an air conditioner, comprising: a housing including an ambient side and an enclosure side, wherein the enclosure side faces an enclosure to be cooled by the air conditioner; the ambient side including an interface that fits in a flush-mounted configuration with respect to a wall of the enclosure to be cooled, whereby the entire air conditioner is disposed within the enclosure.

Another embodiment provides an enclosure, comprising: one or more vehicle components including a body, a chassis, and one or more tires, wherein the body of the vehicle comprises an enclosure; and an air conditioner, comprising: a housing including an ambient side and an enclosure side, wherein the enclosure side faces the interior of the enclosure; the ambient side including an interface that fits in a flush-mounted configuration with respect to a wall of the enclosure, whereby the entire air conditioner is disposed within the enclosure.

The foregoing is a summary and thus may contain simplifications, generalizations, and omissions of detail; consequently, those skilled in the art will appreciate that the summary is illustrative only and is not intended to be in any way limiting.

For a better understanding of the claimed embodiments, reference is made to the following description and the accompanying drawings.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a feature, structure, or characteristic described in connection with the embodiment is included in at least one embodiment, which may or may not be claimed. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, etc. In other instances, well-known structures, materials, or operations are not shown or described in detail to avoid obfuscation.

An embodiment provides a flush-mounted or recessed-mounted air conditioning unit, where the unit is substantially flush with or recessed within the wall (including an opening therein for ambient air entry), the wall defining the enclosed space that is being cooled by the unit. Thus, an embodiment provides an air conditioning unit that does not extend appreciably into the ambient environment, making it particularly suitable for installation in small spaces, such as within a vehicle passenger compartment or toll booth.

The description now turns to the figures, and certain illustrated example embodiments are described. The following description is intended to illustrate certain example embodiments to facilitate understanding of the appended claims, but is not intended to limit the scope of the appended claims.

Figure 1:
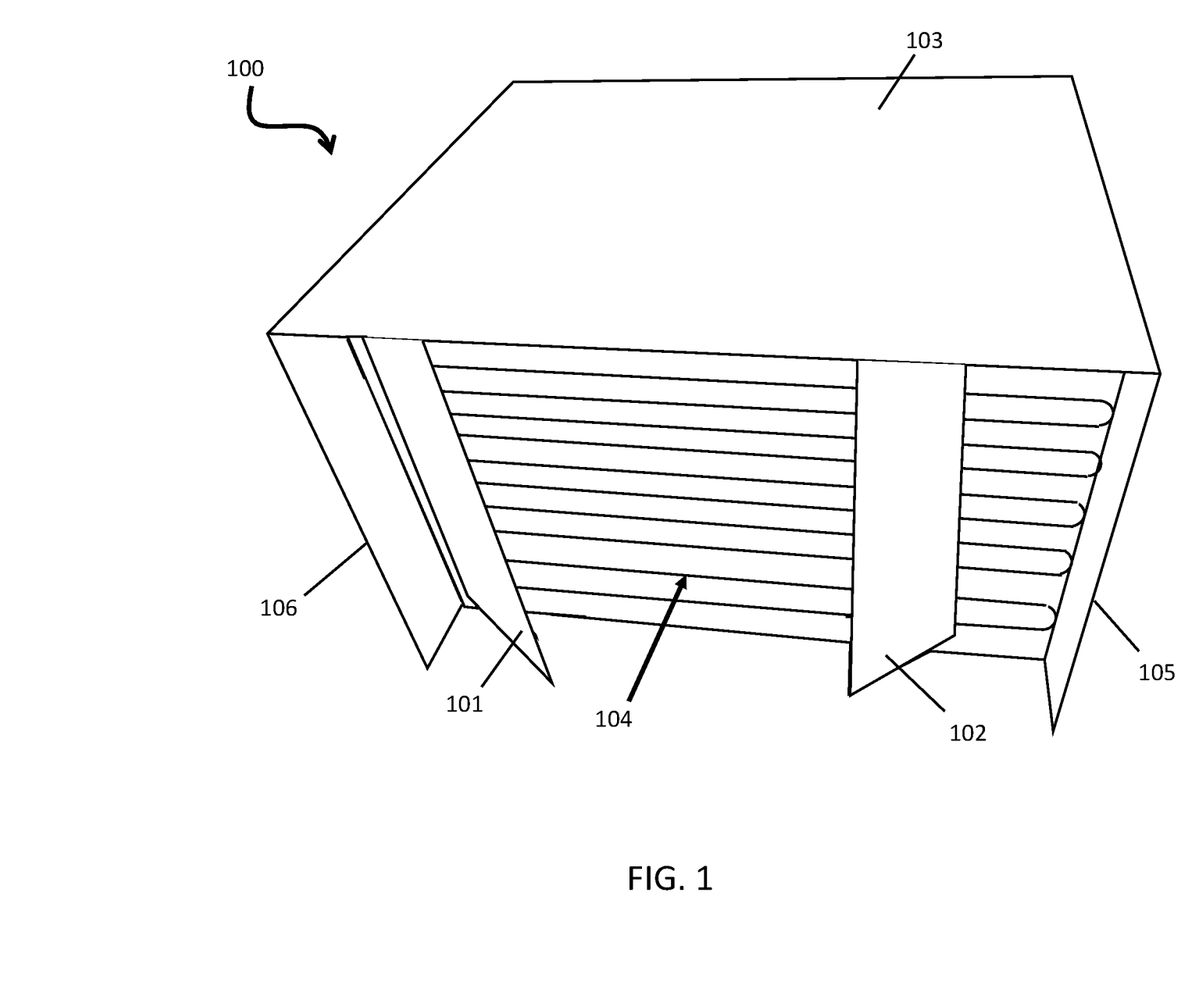
FIG. 1 illustrates a perspective view of an ambient side of an example air conditioning unit according to an embodiment.

Referring to FIG. 1, illustrated is a recessed air conditioning unit 100 that can be mounted flush with or recessed within a partition (not shown in FIG. 1) separating an enclosed space from the external environment. This permits the air conditioning unit 100 to be virtually unseen from outside the enclosed space. The air conditioning unit 100 is very quiet, so it can be used in areas where people will be working or occupying space, e.g., sleeping. The air conditioning unit 100 has particular application where a commercially available window air conditioning unit cannot be used because a conventional unit would extend too far into the external environment. Such applications for the air conditioning unit 100 can include, but are in no way limited to, a camper or other recreational vehicle, toll booths, or other like areas where space is at a premium and larger units that overhang from a structure are unusable.

The air conditioning unit 100 can include the same core set of mechanical components that are used in commercially available window air conditioning units. This includes those components that are typically housed on a tray surface within the unit. For example, the compressor, evaporator coil, heat pump, fan motor, and condenser coil of a standard window air conditioning unit can be used. However, in an embodiment certain components are designed or included for a specific purpose, e.g., quiet operation. For example, a rotary compressor and single fan motor may be included to promote high efficiency and quiet operation of the unit. Similarly, a barrier, such as a foam barrier, may be included to promote sound insulation within the unit.

The air conditioning unit 100 of FIG. 1 comprises a housing 103 that permits ambient air to enter the ambient side of the unit even if the unit is flush mounted with, or even recessed within, the partition defining the enclosed space (e.g., a wall). The housing 103 includes an ambient side where condenser coils 104 are located. The housing 103 also includes baffles 101, 102. The baffles, in the example shown in FIG. 1, comprise a set of panels 101, 102 that are angled inward so as create a gap/space between each of the baffles and either the left panel 106 or right panel 105 of the housing 103. Ambient air can enter the air conditioning unit 100 through these spaces. Heated ambient air can then exit the air conditioning unit 100 through the condenser coils 104 in the space between the two baffles 101, 102.

Figure 2:
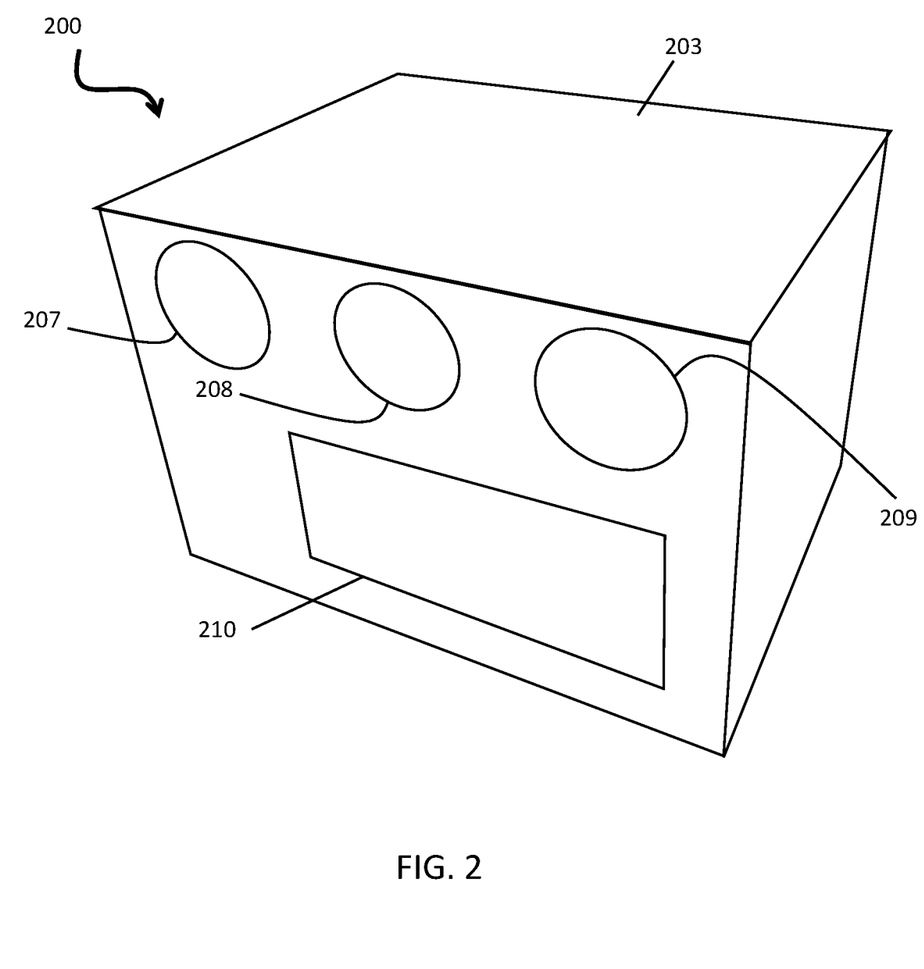
FIG. 2 illustrates a perspective view of the enclosure side of the example air conditioning unit of FIG. 1.

Referring to FIG. 2, a perspective view of an enclosure side of the air condition unit 200 is illustrated. The enclosure side panel of the housing 203 includes multiple duct openings 207, 208, 209, which allow for remote ducting of cool air (via ducting, not shown) returned to the enclosure. The duct openings 207, 208, 209 ensure that cool air can circulate into the enclosure even if the enclosure side of the air conditioning unit 200 is otherwise not accessible. The number of duct openings can be modified, and some non-limiting embodiments include between 2 and 4 ducts.

In FIG. 2, the unit is shown with three duct openings 207, 208, 209 that are each about 4" (inches) in diameter. This size, as with other sizes, dimensions and measurements described herein, is intended to be an example only. Not shown is the ducting (e.g., plastic or foil tubing) that could be connected to the duct openings 207, 208, 209. The ducting can be positioned so as to expel cool air at various points throughout the enclosed space.

An enclosure side intake 210 is included in the housing 203 to admit or intake warm enclosure side air. This warm enclosure air is circulated through and among evaporator coils (not illustrated in FIG. 2) to remove heat from the enclosure air. Cooled air is returned to the enclosure via duct openings 207, 208, 209, as further described in connection with FIG. 3 and FIG. 4.

The housing 203 can be composed of any suitable material, and the choice of material may depend on the intended purpose of the air conditioning unit 200, the cost of materials, the implementation environment, e.g., any weight requirements, etc. In an embodiment, the housing 203 is composed of corrugated plastic. Corrugated plastic is lightweight and has particular application where weight is an issue, such as in a camper or other recreational vehicle. In an embodiment, the housing is made of metal. Metal may have a more aesthetically pleasing look than corrugated plastic, and thus a metal housing may be more advantageous in applications where the unit will be visible, such as within a toll booth or other similar type of enclosed space.

The operation of an air conditioning unit 100, 200 will now be explained with reference to FIG. 3, which is a top view of an air conditioning unit and enclosure, and FIG. 4, which is a side view of an air conditioning unit.

Figure 3:
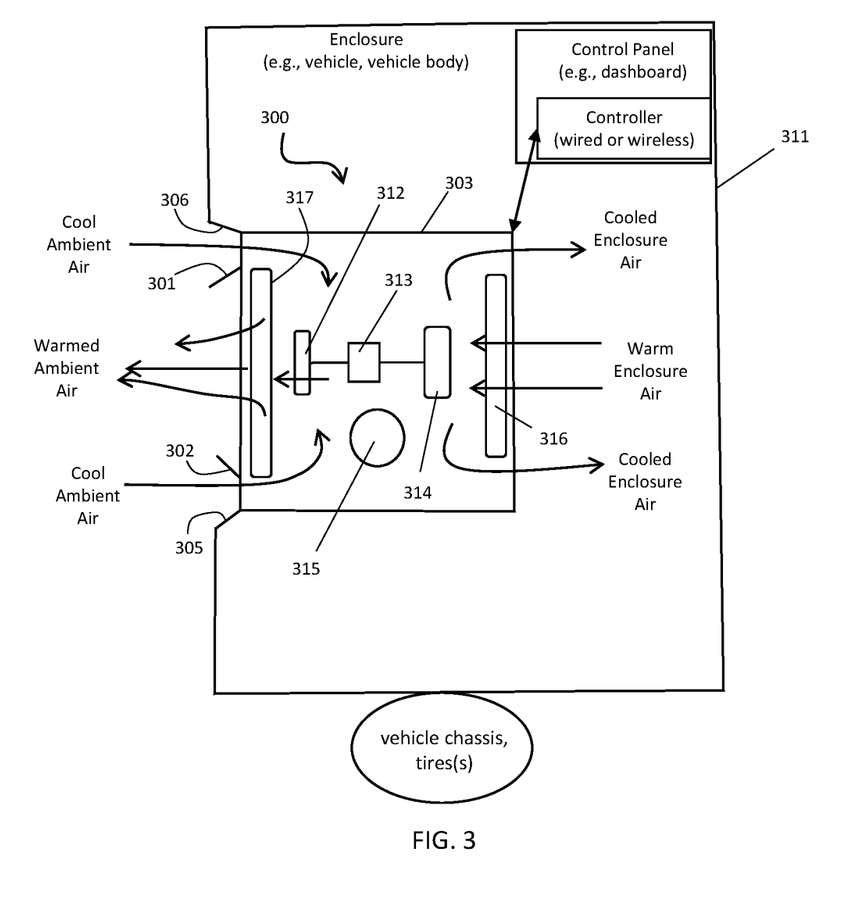
FIG. 3 illustrates a top view schematic drawing of an air conditioning unit according to an embodiment.

As is illustrated in FIG. 3, cool ambient air from outside the enclosure 311 (cool ambient air indicated on the left side of FIG. 3) enters the air conditioner unit 300 in the space between the side panels 305, 306 of the housing 303 and the baffles 301, 302. Air may be circulated within the air conditioning unit 300 via action of a fan or impeller 312, which is in turn driven by a fan motor 313. An enclosure side fan or impeller 314 may also be driven by the motor 313 to circulate air on the enclosure side of the air conditioning unit 300. A compressor 315 is in fluid communication with condenser coils 317 and evaporator coils 316.

In a conventional air conditioner, the cool ambient air would enter through vents on the exposed sides and/or top of the unit housing. The cool ambient air can then flow past the condenser coil 317 and back out through the rear of the air conditioner unit 300 as warmed ambient air, consistent with the air flow in a conventional unit. In an embodiment, ambient air can be supplied through the top of the condenser section 317, in addition to or instead of via the sides, and can be discharged out the rear or ambient side of the air conditioning unit 300 (refer to FIG. 4 for an illustrated example of top side ambient air inlet).

On the enclosure side of the air conditioning unit 300 (right side in FIG. 3), which includes the evaporator 316, warm enclosure air enters the unit from the enclosed space and passes over the evaporator 316 where it is cooled. The cooled air is then returned to the enclosed space 311.

In an embodiment, the enclosure includes the entire air conditioning unit in a flush-mounted or recessed mounted configuration. For example, a vehicle body may form the enclosure, or part thereof. The vehicle enclosure may comprise other vehicle components, e.g., tires and a chassis or frame on the outside, and a control panel on the inside, such as a dashboard. A remote-control part for operating the air conditioning unit 300 may be placed in the dashboard or other control panel. In an embodiment, the enclosure may form a trailer, a toll both, or a variety of vehicle types, e.g., a camper or a recreational vehicle, a truck, etc. Therefore, an enclosure as used herein may form a system including the air conditioning unit 300.

Figure 4:
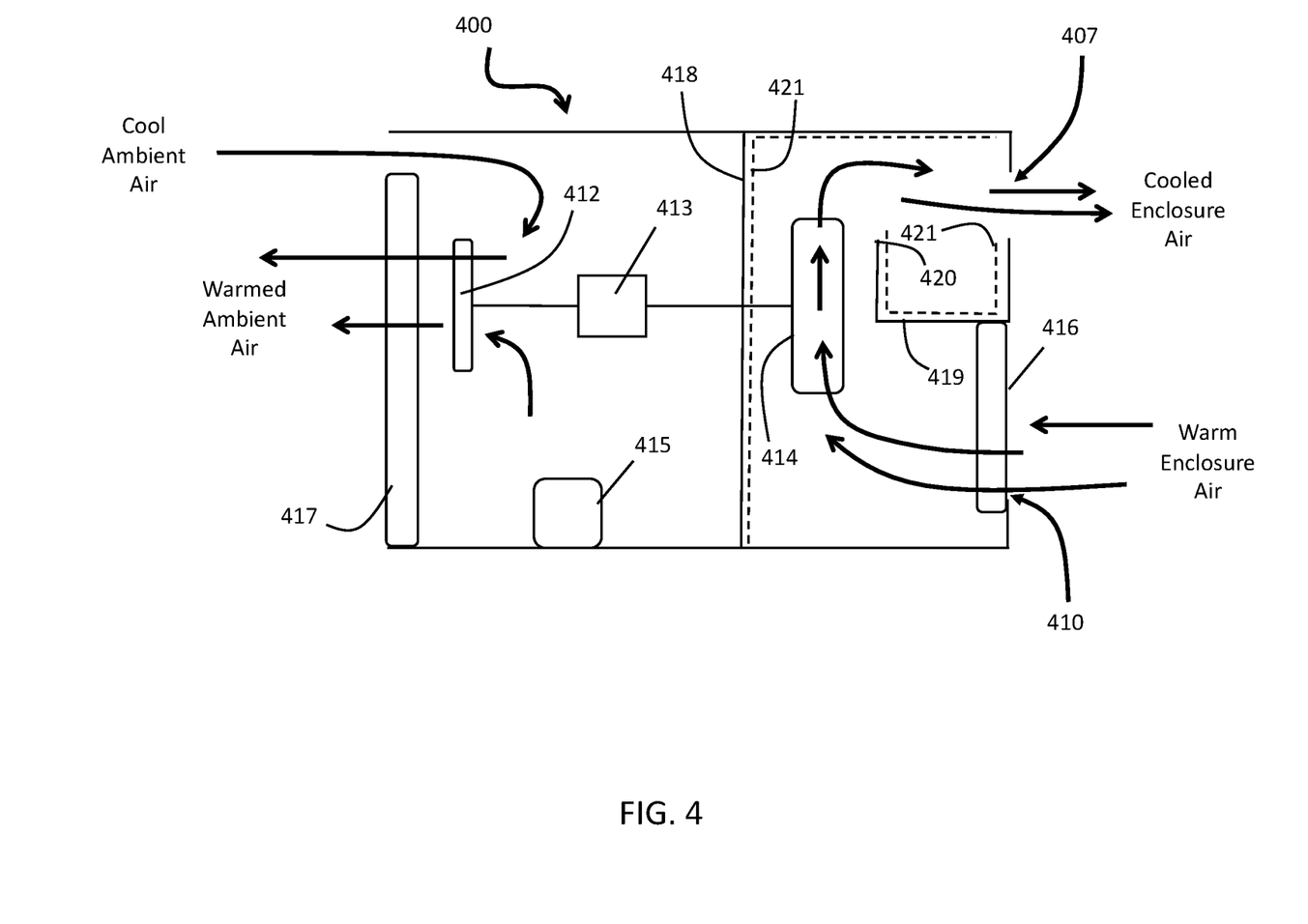
FIG. 4 illustrates a side view schematic drawing of an air conditioning unit according to an embodiment.

As can be seen in FIG. 4, which is a side view of an example air conditioning unit 400, cool ambient side air enters from outside the air conditioner unit 400, circulates via action of a fan or impeller 412 (in turn powered by fan motor 413), and is returned/expelled to ambient, exiting the air conditioning unit 400 by passing over the condenser coils 417. A divider 418 prevents ambient side air from mixing with enclosure side air and also facilitates circulation of air within respective ambient and enclosure side compartments of the air conditioning unit 400.

On the cooling side of the unit, the warm air from within the enclosed space is passed over the evaporator coil 416, e.g., via intake such as illustrated at 410 (corresponding to intake 210 of FIG. 2). The evaporator coil 416 receives refrigerant from compressor 415. The refrigerant within the evaporator coil 416 exchanges heat with the warm enclosure air, producing cooled enclosure air, which is returned to the enclosed space (e.g., via duct openings 207, 208, 209 of FIG. 2) via duct opening 407. The enclosure side air may be circulated in a directional fashion by enclosure side fan or impeller 414, driven by motor 413, and internal wall structures 419, 420.

The air conditioning unit 400 may be positioned in a concealed location, such as under the seat of a camper or other vehicle, and thus it may be difficult to access the unit to operate a control interface placed on the unit. As a solution to this problem, the air conditioning unit 400 can include a remote controller. The remote controller can be a low voltage wired controller that can be incorporated into an existing switch board of the camper or other vehicle. The remote controller may also be implemented as a wireless controller, e.g., communicating via infrared, short range wireless, or other wireless communication technology.

The controller can provide the operator with the ability to control the air conditioning unit 400, such as by powering on or off the air conditioning unit 400, or setting the temperature setpoints. The controller can also allow for remote monitoring of the temperature within the enclosed space through an LCD screen that displays the temperature of the enclosed space and/or the setpoints at which temperature the air conditioning unit 400 will begin cooling or heating. The remote controller can include relays and a low voltage transformer.

The air conditioning unit 400 can also include noise reduction foam molding 421 that can be used to isolate the fan motor 413 and compressor 415 from the cool air return area (enclosure side of the air conditioning unit 400), as illustrated in FIG. 4. The foam divider 421 also may be visible through the duct openings (207, 208, 209 of FIG. 2). This noise reduction can be especially advantageous when the air conditioning unit 400 is placed in a small enclosed space, such as beneath the seat of a camper, in an overhead compartment or ceiling of a recreational vehicle, etc. The foam divider 421 may comprise polystyrene foam (e.g., STYROFOAM) or other suitable material. In an embodiment, a lightweight material is selected. When the foam divider 421 is present, warm air can enter the unit from the enclosed space, flow over the evaporator 416 where it is cooled, and then the cooled air can flow through a channel created by the foam divider 421 before reentering the enclosed space, as shown in FIG. 4. As shown in FIG. 4, the foam divider 421 isolates the cooled air from the evaporator coil and the incoming warm air. In an embodiment, the foam divider 421 may be formed of a single piece or in multiple pieces. STYROFOAM is a registered trademark of Dow Chemical Company in the United States and/or other jurisdictions.

The air conditioning unit 400 can also include programming that allows a cooling cycle to function independently of the fan cycle and/or temperature monitoring. Program code of the programming may be executed by a processor or via a logic circuit. This programming feature allows an operator to run a fan cycle (and thereby circulate air within the enclosed space, the ambient side space, or both) and the temperature monitoring (and thereby monitor the temperature within the enclosed space) while the cooling cycle (e.g., the compressor 415 and evaporator 416) is not running. This feature can be implemented by adding additional relays in the unit to separate these functions and permit them to run independently. A remote sensor can be added to monitor the return air temperature on the enclosure side, and cycle the compressor 415 for a cooling cycle separate from the fan cycle.

Figure 5:
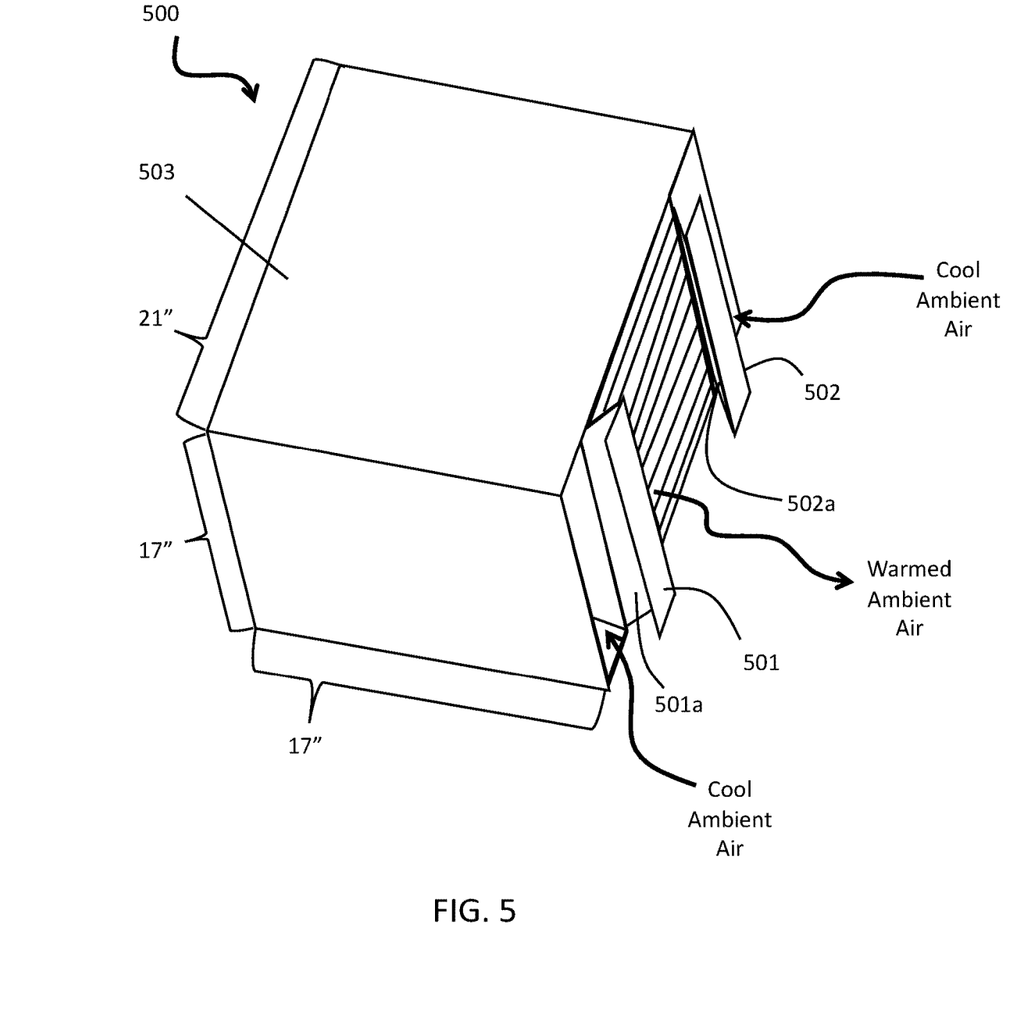
FIG. 5 illustrates a perspective view of an ambient side of an example air conditioning unit according to an embodiment.

Turning to FIG. 5, the baffles, e.g., 101, 102 of FIG. 1, may be configured in a variety of ways. In the example illustrated in FIG. 5, the baffles 501, 502 include additional panels, 501a, 502a, respectively. The baffles 501, 502 may be attached to the housing 503 in a releasable manner, i.e., they may be removed. Further, in an embodiment, the baffles 501, 502 may be attached to the housing 503 in a hinged manner, or other movable manner, such that they may be rotated about a hinge attachment with the housing 503 and/or may be moved laterally, e.g., slid along a lateral edge of the housing 503. In addition, the added panels 501a, 502a, may be attached via a hinge or other movable mechanism with respect to the remaining panel of the baffles 501, 502. The baffles 501, 502 may therefore comprise extendable baffles that can be pulled out to reach a flush surface. The baffles 501, 502 keep a separation between the air in and air out, allowing for adjustment of the air conditioner in or out of the space it is mounted in and gives adjustment of the baffles to keep the unit flush on the outside and prevent ambient air recirculation. This permits an operator or installer to adjust the baffles 501, 502 according to any environmental constraints. For example, in an implementation where space is at a premium, the baffles 501, 502 may be removed. In another implementation, baffles 501, 502 may be extended to cover an additional opening area of the enclosure (e.g., where the enclosure opening is substantially larger than the height and/or width of the housing 503).

In an embodiment, as illustrated in FIG. 5, the width of the housing 503 is about 21" (inches). In an embodiment, the height and length of the housing 503 is about 17" (inches). This small size permits an embodiment to be positioned within small spaces, such as within a toll booth or a vehicle compartment, and offers a powerful air conditioning unit 500 to such environments.

As may be appreciated from the foregoing, an embodiment includes one or more of a capability of being recessed mounted; having a low voltage remote control to control operation of the air conditioning unit 400 from an existing switch panel and/or wirelessly; being easily ducted to direct cooled air to various enclosed spaces; operating at a low noise level (i.e., it is quiet); being lightweight; being energy efficient; and comprising a concealable design.

An embodiment therefore permits installation in a small enclosure. By way of example, an embodiment may be implemented in a smaller enclosure to provide cooling, for example in work-travel trailers such as trailers that haul race cars and motorcycles, which are used as mobile workshops.

Example embodiments are described herein with reference to the figures, which illustrate example methods, devices and products according to various example embodiments. It is worth noting that while specific elements are used in the figures, and a particular ordering of elements has been illustrated, these are non-limiting examples. In certain contexts, two or more elements may be combined, an element may be split into two or more elements, or certain elements may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An air conditioner, comprising:
a housing including an ambient side and an enclosure side separated by a divider, wherein the enclosure side faces an enclosure to be cooled by the air conditioner;
the ambient side including an interface formed by a first and second side of the housing, the interface fitting in a flush-mounted configuration with respect to a wall of the enclosure to be cooled, whereby the entire air conditioner is disposed within the enclosure;
wherein the ambient side comprises one or more baffles affixed thereto, a first baffle of the one or more baffles being positioned on the ambient side to define a space between the first baffle and the first side of the housing;
wherein the one or more baffles are extendable;
a fan that moves air from within the housing to an exterior of the housing; and
condenser coils disposed within the housing;
whereby ambient air enters the housing via the space between the first baffle and the first side of the housing, and warmed ambient air exits the housing via transit over the condenser coils and through a second space defined between the first baffle and one of: a second baffle of the one or more baffles, and the second side of the housing.

2. The air conditioner of claim 1, wherein the one or more baffles are extendable in a hinged fashion.

3. The air conditioner of claim 1, wherein the enclosure side includes one or more duct openings.

4. The air conditioner of claim 3, wherein the one or more duct openings receive cooled airflow for recirculation into the enclosure.

5. The air conditioner of claim 3, comprising a fan motor, wherein the fan motor operates the fan.

6. The air conditioner of claim 5, comprising a foam molding, wherein the foam molding is positioned between the fan motor and the one or more duct openings.

7. The air conditioner of claim 6, wherein the foam molding acts to insulate sound produced by the fan motor with respect to the enclosure.

8. The air conditioner of claim 1, comprising a controller.

9. The air conditioner of claim 8, wherein the controller comprises a wired controller.

10. The air conditioner of claim 8, wherein the controller is a wireless controller.

11. A vehicle, comprising:
one or more vehicle components including a body, a chassis and one or more tires attached to the chassis, wherein the body forms an enclosure;
an air conditioner, comprising:
a housing including an ambient side and an enclosure side separated by a divider, wherein the enclosure side faces the interior of the enclosure;
the ambient side including an interface formed by a first and second side of the housing, the interface fitting in a flush-mounted configuration with respect to a wall of the enclosure to be cooled, whereby the entire air conditioner is disposed within the enclosure;
wherein the ambient side comprises one or more baffles affixed thereto, a first baffle of the one or more baffles being positioned on the ambient side to define a space between the first baffle and the first side of the housing;
wherein the one or more baffles are extendable;
a fan that moves air from within the housing to an exterior of the housing; and
condenser coils disposed within the housing;
whereby ambient air enters the housing via the space between the first baffle and the first side of the housing, and warmed ambient air exits the housing via transit over the condenser coils and through a second space defined between the first baffle and one of: a second baffle of the one or more baffles, and the second side of the housing.

12. The vehicle of claim 11, wherein:
the one or more vehicle components comprise a control panel; and
the control panel comprises a controller for the air conditioning unit.

13. The vehicle of claim 12, wherein the vehicle is selected from a camper, a trailer, and a truck.

* * * * *